(12) United States Patent
Chen et al.

(10) Patent No.: US 9,941,065 B2
(45) Date of Patent: Apr. 10, 2018

(54) CURRENT ASSIGNMENT METHOD AND CORRESPONDING SWITCH ARRANGEMENT

(71) Applicant: Siemens Aktiengesellschaft, Munich (DE)

(72) Inventors: Wei Gang Chen, Shanghai (CN); Mario Dankert, Raguhn-Jessnitz (DE); Zhong Yi He, Shanghai (CN); Yue Zhuo, Beijing (CN)

(73) Assignee: Seimens Aktiengesellschaft, Munich (DE)

( * ) Notice: Subject to any disclaimer, the term of this patent is extended or adjusted under 35 U.S.C. 154(b) by 1023 days.

(21) Appl. No.: 14/259,279

(22) Filed: Apr. 23, 2014

(65) Prior Publication Data

US 2014/0319929 A1 Oct. 30, 2014

(30) Foreign Application Priority Data

Apr. 26, 2013 (CN) .......................... 2013 1 0150057

(51) Int. Cl.
*H01H 19/14* (2006.01)
*H01H 9/54* (2006.01)
(Continued)

(52) U.S. Cl.
CPC .......... *H01H 9/54* (2013.01); *H01H 71/1081* (2013.01); *H01H 71/123* (2013.01);
(Continued)

(58) Field of Classification Search
CPC ......... H01H 9/54; Y10T 307/76; H02H 7/262
(Continued)

(56) References Cited

U.S. PATENT DOCUMENTS

2008/0156753 A1 7/2008 Permerlani et al.
2008/0158750 A1 7/2008 Premerlani et al.
(Continued)

FOREIGN PATENT DOCUMENTS

CN 101212136 A 7/2008
CN 101237144 A 8/2008
(Continued)

OTHER PUBLICATIONS

Chinese Office Action dated Apr. 28, 2017.
Chinese Office Action dated Jul. 6, 2016.

*Primary Examiner* — Alfonso Perez Borroto
(74) *Attorney, Agent, or Firm* — Harness, Dickey & Pierce, P.L.C.

(57) ABSTRACT

A current assignment method and a switch arrangement are disclosed for assigning current, the switch arrangement including two series-connected switches, each including a trigger unit to check whether a preset current condition is satisfied. A signal is sent by the trigger unit of a switch which is postpositionally placed when the current condition is satisfied, the signal at least preventing the immediate triggering of a correspondingly prepositionally placed switch after being received by the corresponding trigger unit. To achieve a technically simple communication connection between switches, in at least one embodiment each trigger unit is formed so as to send but and receive the signal, and each trigger unit includes a measurement unit for measuring an energy flow direction in a subordinate switch and a conversion unit for converting from sending to receiving or from receiving to sending appropriately when the energy flow direction is reversed.

8 Claims, 3 Drawing Sheets

(51) Int. Cl.
    *H01H 71/10*     (2006.01)
    *H01H 71/12*     (2006.01)
    *H02H 7/26*     (2006.01)
    *H01H 9/16*     (2006.01)
    *H02H 7/30*     (2006.01)

(52) U.S. Cl.
    CPC ............. *H02H 7/262* (2013.01); *H01H 9/167* (2013.01); *H02H 7/30* (2013.01); *Y10T 307/76* (2015.04)

(58) Field of Classification Search
    USPC ........................................................ 307/115
    See application file for complete search history.

(56) References Cited

U.S. PATENT DOCUMENTS

| | | | |
|---|---|---|---|
| 2009/0257157 A1 | 10/2009 | Vicente et al. | |
| 2010/0164503 A1 | 7/2010 | Sawhney et al. | |
| 2014/0192458 A1* | 7/2014 | Valdes ................... | H01H 83/00 361/626 |

FOREIGN PATENT DOCUMENTS

| | | | |
|---|---|---|---|
| CN | 101562325 A | 10/2009 | |
| CN | 101771269 A | 7/2010 | |
| CN | 102882197 A | 1/2013 | |
| CN | 103022993 A | 4/2013 | |

\* cited by examiner

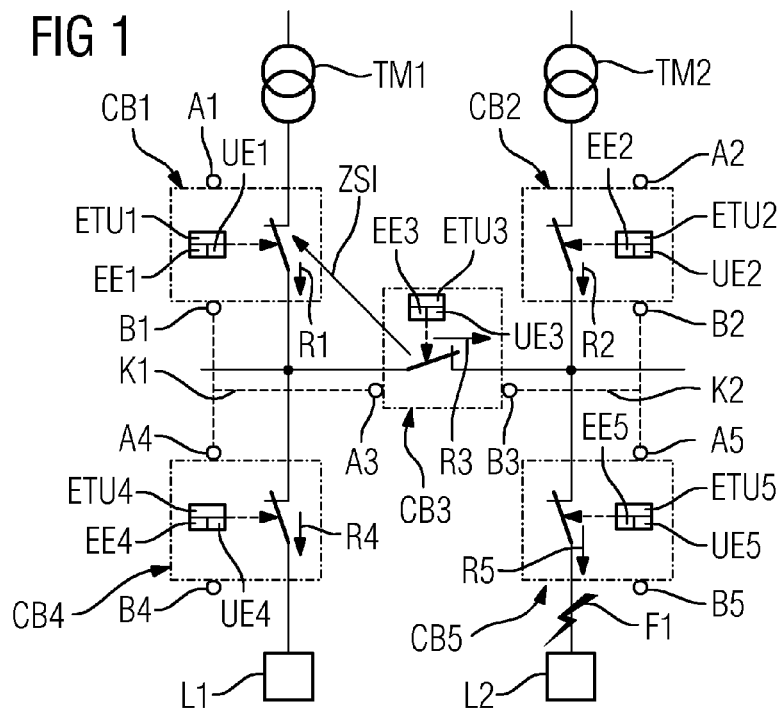
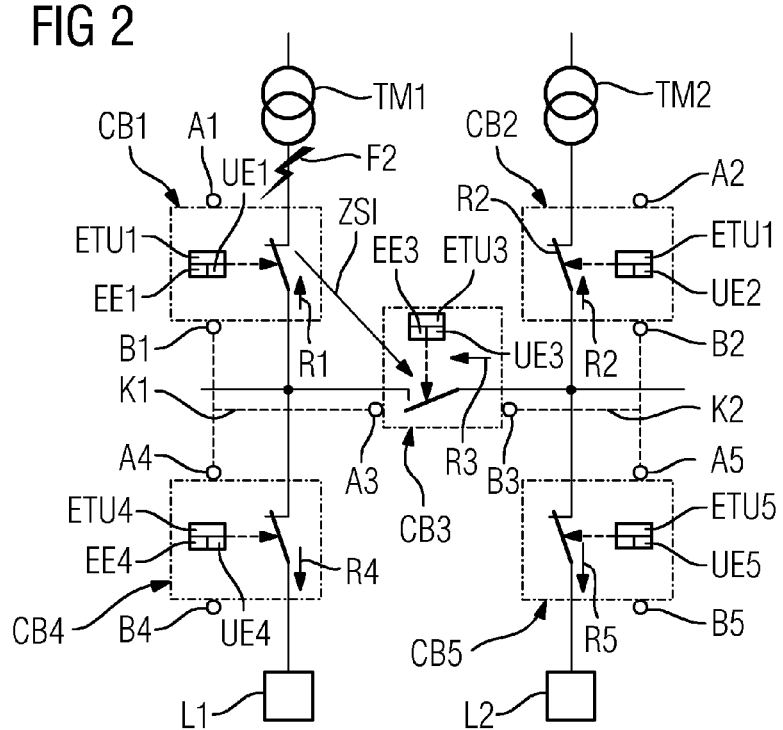

CURRENT ASSIGNMENT METHOD AND CORRESPONDING SWITCH ARRANGEMENT

PRIORITY STATEMENT

The present application hereby claims priority under 35 U.S.C. § 119 to Chinese patent application number CN 201310150057.5 filed Apr. 26, 2013, the entire contents of which are hereby incorporated herein by reference.

TECHNICAL FIELD

At least one embodiment of the present invention generally relates to a current assignment method and/or a switch arrangement for assigning current.

BACKGROUND ART

As is known, in a current assignment system, current is assigned to equipment branches (or loads) with the aid of a switch arrangement by way of switches, in particular power switches with a low voltage range. These switches are correspondingly designed for a rated current, and interrupt the current flowing through the switch in the event of a fault, for example a short circuit. At such a time, only the equipment branch associated with the fault or closest thereto is disconnected correspondingly. Such behavior is called selective disconnection.

Inside each switch is a mutual inductor device (Wandlereinrichtung) and a trigger unit. The mutual inductor device correspondingly measures the current flowing through the switch by way of a mutual inductor, wherein the trigger unit correspondingly checks whether a previously given current condition is satisfied.

In order to disconnect selectively, these switches communicate with each other. For example, when a current condition in a postpositionally placed switch (as viewed from the feed direction) has been satisfied, for instance because a short circuit has occurred, that switch informs a prepositionally placed switch (as viewed from the feed direction) of this situation by way of a signal (locking signal). As a result, the prepositionally placed switch, which similarly recognizes the short circuit, will not itself trigger immediately, but will wait for a fixed period of time (a preset delay time) to see whether the postpositionally placed switch triggers. If the postpositionally placed switch has not triggered by the time the delay time has ended, the prepositionally placed switch interrupts the current itself.

The communication path is in general correspondingly conducted in the feed direction, i.e. opposite to the direction of energy flow, from the postpositionally placed switch to the prepositionally placed switch. This form of selectivity is called reduced-time selective control ZSS (zeitverkürzte Selektivitätssteuerung), also well known as ZSI (zone selective interlocking).

A defect of this is that the current direction cannot always be clearly determined, but can vary, for instance when there are multiple feed power supplies or the load is in the form of an electric motor. For example, when there are multiple feed power supplies, even if one power supply is disconnected or connected without interference in the normal operating state, this will lead to a reversal of the energy flow direction in at least one switch. Considering the energy flow direction by way of well-known communication connections will lead to a confused jumble of numerous connections (the majority being wire connections). Since each energy flow direction correspondingly needs one input and one output, the ZSI connections (ZSI communication) of a switch need a total of four connection terminals.

SUMMARY

At least one embodiment of the present invention is directed to a current assignment method and/or a switch arrangement for assigning current, wherein technically simple communication connections are realized between switches and changes in the energy flow direction are still taken into account.

Relating to at least one embodiment of the method, each trigger unit can both send and receive signals and correspondingly measures an energy flow direction in a subordinate switch, and when the energy flow direction is reversed, converts from sending to receiving signals or conversely converts from receiving to sending signals appropriately, according to whether signals were sent or received previously.

In order that a complex switch arrangement may be achieved without any change having to be made, it is proposed that each trigger unit have a first signal element and a second signal element. If a first trigger unit is directly connected to a second trigger unit, and the first signal element of the first trigger unit is connected to the second signal element of the second trigger unit, then when a conversion takes place, the second signal element of the first trigger unit is connected to the first signal element of the second trigger unit.

By "technically simple" is meant that one of the two signal elements of each trigger unit is formed as a switch device while the other signal element is formed as an energy source, the switch device (SS) in one trigger unit (ETU) forms a circuit together with the energy source (EQ) in another trigger unit (ETU), and when the signal is sent the switch device of the postpositionally placed switch correspondingly closes, wherein a voltage change and/or a current change caused in the circuit by a switch operation forms the signal, and the prepositionally placed switch can measure the signal.

Relating to the switch arrangement, at least one embodiment specifies that each trigger unit is formed so as to send and receive the signal and has: a) correspondingly a measurement unit for measuring an energy flow direction in a subordinate switch and b) a conversion unit for converting from sending to receiving or conversely from receiving to sending appropriately when the energy flow direction is reversed.

If each trigger unit has two different signal elements, wherein one signal element of one trigger unit is correspondingly connected to another signal element of another trigger unit, and when a conversion takes place, a connection is only made between the remaining (other) two signal elements of the two trigger units, then without making any change, these switches can be used in a complex switch arrangement.

By "technically simple" is meant that one of the two signal elements of each trigger unit is formed as a switch device while the other signal element is formed as an energy source, the switch device (SS) in one trigger unit (ETU) forms a circuit together with the energy source (EQ) in another trigger unit (ETU), the switch device of the postpositionally placed switch is correspondingly connected to the energy source of the prepositionally placed switch and forms a circuit together with the same, wherein the switch device causes a voltage change and/or a current change in the circuit, the change forming the signal.

BRIEF DESCRIPTION OF THE DRAWINGS

The present invention is explained in detail below with the aid of embodiments. The accompanying drawings show:

FIG. 1 shows a switch arrangement comprising a short circuit after an end switch, FIG. 2 shows a switch arrangement comprising a short circuit located directly after a power supply according to FIG. 1.

DETAILED DESCRIPTION OF THE EXAMPLE EMBODIMENTS

Figure 3:
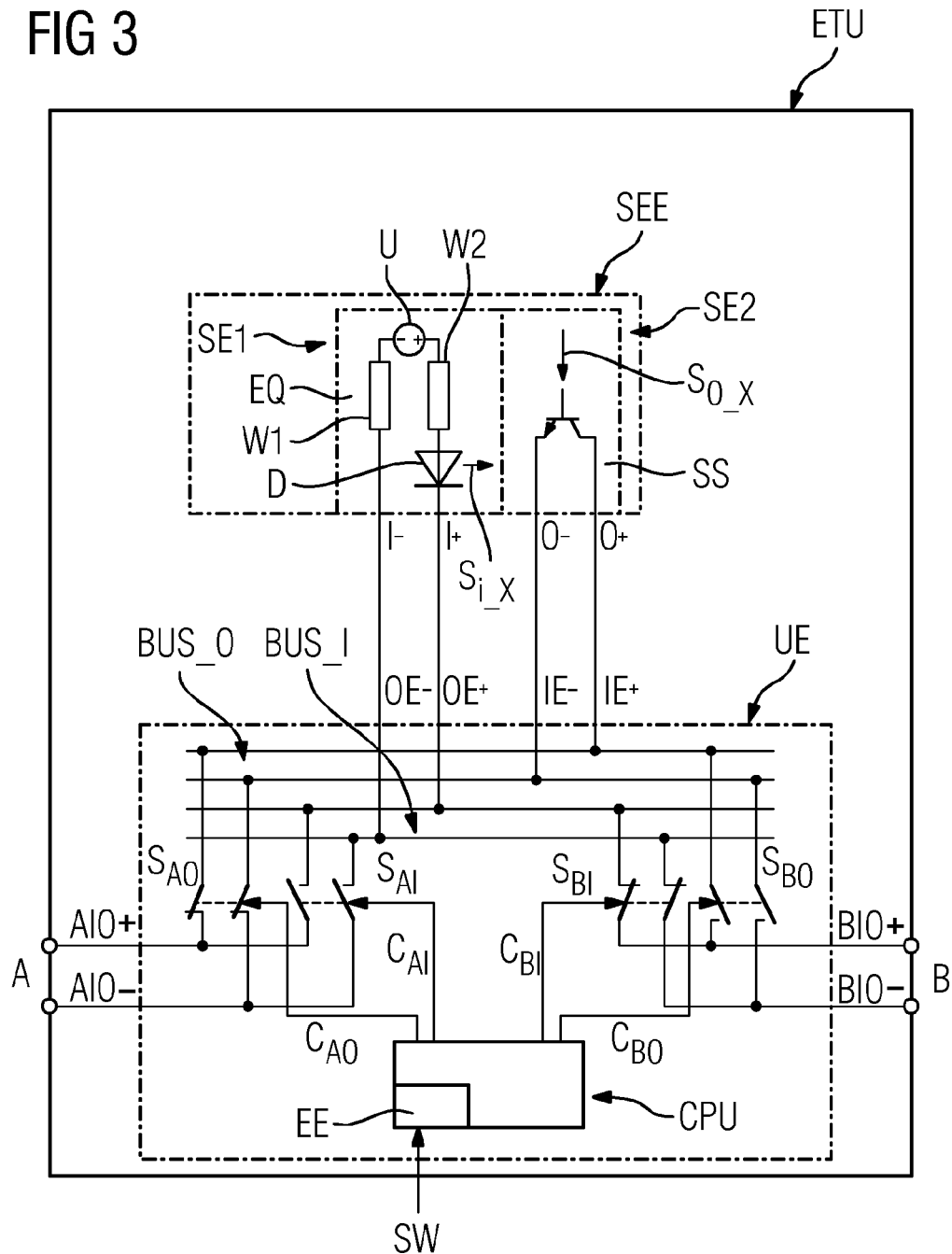
FIG. 3 is a schematic diagram of a trigger unit of a switch of the switch arrangement according to FIG. 1.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

At least one embodiment of the present invention is directed to a current assignment method and/or a switch arrangement for assigning current, wherein technically simple communication connections are realized between switches and changes in the energy flow direction are still taken into account.

Relating to at least one embodiment of the method, each trigger unit can both send and receive signals and correspondingly measures an energy flow direction in a subordinate switch, and when the energy flow direction is reversed, converts from sending to receiving signals or conversely converts from receiving to sending signals appropriately, according to whether signals were sent or received previously.

In order that a complex switch arrangement may be achieved without any change having to be made, it is proposed that each trigger unit have a first signal element and a second signal element. If a first trigger unit is directly connected to a second trigger unit, and the first signal element of the first trigger unit is connected to the second signal element of the second trigger unit, then when a conversion takes place, the second signal element of the first trigger unit is connected to the first signal element of the second trigger unit.

By "technically simple" is meant that one of the two signal elements of each trigger unit is formed as a switch device while the other signal element is formed as an energy source, the switch device (SS) in one trigger unit (ETU) forms a circuit together with the energy source (EQ) in another trigger unit (ETU), and when the signal is sent the switch device of the postpositionally placed switch correspondingly closes, wherein a voltage change and/or a current change caused in the circuit by a switch operation forms the signal, and the prepositionally placed switch can measure the signal.

Relating to the switch arrangement, at least one embodiment specifies that each trigger unit is formed so as to send and receive the signal and has: a) correspondingly a measurement unit for measuring an energy flow direction in a subordinate switch and b) a conversion unit for converting from sending to receiving or conversely from receiving to sending appropriately when the energy flow direction is reversed.

If each trigger unit has two different signal elements, wherein one signal element of one trigger unit is correspondingly connected to another signal element of another trigger unit, and when a conversion takes place, a connection is only made between the remaining (other) two signal elements of the two trigger units, then without making any change, these switches can be used in a complex switch arrangement.

By "technically simple" is meant that one of the two signal elements of each trigger unit is formed as a switch device while the other signal element is formed as an energy source, the switch device (SS) in one trigger unit (ETU) forms a circuit together with the energy source (EQ) in another trigger unit (ETU), the switch device of the postpositionally placed switch is correspondingly connected to the energy source of the prepositionally placed switch and forms a circuit together with the same, wherein the switch device causes a voltage change and/or a current change in the circuit, the change forming the signal.

FIG. 1 shows a switch arrangement 1 for assigning current, comprising five switches CB (CB1, CB2, CB3, CB4 and CB5), the switches being formed as low-voltage power switches and connected to two power supplies TM (TM1, TM2), wherein switch CB3 is mounted in a bridge branch. Loads L1 and L2, which are in the form of electric motors for example, are connected to switches CB4 and CB5.

Mechanical switch contacts belong to each switch CB, with current flowing in corresponding switches CB1, CB2, CB3, CB4 and CB5 through these switch contacts. Moreover, each switch CB has an electronic trigger unit ETU (ETU1, ETU2, ETU3, ETU4, ETU5), for checking correspondingly whether the electrical energy (current) flowing through the switch CB satisfies a previously given current condition; in this case, this condition is whether the electrical energy (current) exceeds a threshold.

Switch CB5 is mounted in front of load L2 as an end switch; after this switch is a short circuit F1, represented schematically as a lightning symbol.

The energy flow directions R (R1, R2, R3, R4, R5) generated are marked into the switch arrangement 1 through corresponding switches CB1, CB2, CB3, CB4 and CB5.

The electronic trigger units ETU of the switches CB are connected to each other according to communication by way of connections K1 and K2 (communication connections); in this case, the connections are formed as wire connections, the wire connections being connected to corresponding connection terminals A and B (A1, B1, A2, B2, A3, B3, A4, B4, A5, B5) in the form of sockets of the electronic trigger units ETU.

In other words, each switch CB has a pair of connection terminals A and B, but in this case, it is only at switch CB3 that two connection terminals are used, A3 and B3. Then, in a complex switch arrangement 1 comprising multiple switches CB, two connection terminals A and B are correspondingly used by the majority of switches CB.

Switches CB1, CB3 and CB4 communicate with each other via connection K1; switches CB2, CB3 and CB5 communicate with each other via connection K2.

All the switches CB are selectively disconnected (zone selective interlocked), in other words, when the current condition is satisfied, the trigger unit ETU of the switch CB which is correspondingly postpositionally placed (as viewed in the energy flow direction R) sends a signal S to the trigger unit ETU of the directly correspondingly prepositionally placed switch CB. The signal S informs the prepositionally placed switch CB, and on this basis, the trigger unit ETU of the prepositionally placed switch CB will at least not immediately trigger (be triggered by the trigger unit ETU thereof).

The trigger unit ETU of the prepositionally placed switch CB similarly recognizes that the current condition is satisfied, and so there is a possibility that it will trigger when it has not received the signal S. However, when it receives the signal it will at least not immediately trigger, but wait a period of time before possibly triggering on the basis of whether a fault is present or not.

In FIG. 1, switch CB3 is mounted after switch CB1 (switch CB1 is correspondingly mounted in front of switch CB3). Due to the short circuit F1, switches CB1 and CB3 exceed the threshold of the current condition. Therefore switch CB3 (the trigger unit ETU3 thereof), which is postpositionally placed as viewed in the energy flow direction, sends a signal (S) to the prepositionally placed switch CB1 (the trigger unit ETU 1 thereof); see the diagonal arrow ZSI shown schematically in FIG. 1, pointing from CB3 to CB1. By this method, switch CB1 (the trigger unit ETU1 thereof) knows that switch CB1 need not itself open first.

The switch arrangement 1 shown in FIG. 2 is the same as FIG. 1, except that there is a short circuit F2 located after the power supply TM1 and in front of the switch CB1. The energy flow directions R1 and R3 are reversed.

The two trigger units ETU can both send and receive signals S. Conversion is achieved by way of a conversion unit UE (UE1, UE2, UE3, UE4, UE5). When the energy flow directions R1 and R3 are reversed, the conversion unit converts correspondingly, i.e. if the trigger units were sending previously, then they are converted from sending to receiving, and if the trigger units were receiving previously, then they are converted from receiving to sending. Each trigger unit ETU has a measurement unit EE (EE1, EE2, EE3, EE4, EE5) for measuring the energy flow direction R.

In FIG. 1, electrical energy flows from left to right through CB3, whereas it flows in the opposite direction in FIG. 2, from right to left. The direction of the signal S is correspondingly converted by the conversion unit. That is, in FIG. 1, the trigger unit ETU1 receives signal S and the trigger unit ETU3 sends signal S, whereas in FIG. 2, this arrangement is reversed after conversion. The wire connections remain unchanged.

In FIG. 2, the two trigger units ETU1 and ETU3 correspondingly recognize that the current condition is satisfied. Therefore the trigger unit ETU1 sends a signal S to the trigger unit ETU3, to inform the latter that it is going to trigger the switch CB1 to open.

In FIGS. 1 and 2, switches CB4 and CB5 remain unchanged, independently of the short circuits F1 and F2. The subordinate conversion units UE4 and UE5 will not cause reversal, because, the energy flow directions R4 and R5 have not changed.

The switches CB form multiple switch pairs, which are correspondingly formed by two switches directly connected in series according to current, in other words, there is no other switch CB therebetween. Thus, in FIGS. 1 and 2, these switch pairs are correspondingly formed by the two switches CB1 and CB3, CB3 and CB4, CB2 and CB3, and CB3 and CB5, and as stated above are connected according to current and according to communication.

Each switch arrangement 1 can be dismantled down to an external switch CB in such a switch pair, or in other words, includes multiple switch pairs of this kind. Thus, for the sake of simplicity, just one switch pair is observed in the following. In principle, the following explanation is suitable for all such switch pairs.

Here, all the switches CB in the embodiments have the same structural form.

FIG. 3 shows by way of example a schematic diagram of a trigger unit ETU of a switch, which is applicable to all switches CB. Regarding the signal S, the trigger unit ETU comprises a signal element unit SEE comprising two signal elements; an energy source EQ (signal element SE1) and a switch device SS (signal element SE2). The energy source EQ has two connection terminals I− and I+, while the switch device SS has connection terminals O− and O+, and as shown in FIG. 3, these are connected to each other. A measurement unit EE is integrated in the conversion unit UE, the measurement unit measuring the energy flow direction R using a current mutual inductor signal SW inputted by a hollow coil and by use of a processor unit CPU. When the current condition is satisfied, in accordance with a pre-setting, a signal S is sent via a connection terminal A and received via a connection terminal B according to the energy flow direction R. This arrangement is reversed when the energy flow direction is switched: the signal S is send via the connection terminal B and received at the connection terminal A.

Each conversion unit UE has two bus wires Bus_O and Bus_I, wherein O denotes output and I denotes input. The wires Bus_O and Bus_I can be connected alternately to connection terminals AIO+, AIO−, BIO+ and BIO— by way of direction switches SAO, SAI, SBO and SBI. In FIG. 3, direction switches SAO and SBI are closed, while direction switches SAI and SBO are open. Depending on the direction R of energy flow through a switch CB, all the direction switches SAO, SAI, SBO and SBI are closed or opened in a controlled way by the processor unit CPU by way of switch signals CAO, CAI, CBO and CBI.

The energy source EQ of the signal element unit SEE is connected to the Bus_I bus wire via connection terminals OE− and OE+. Here, the energy source EQ is formed by a 15 V DC voltage U, resistors W1 and W2, and a photodiode D. Here, the photodiode D sends a light signal Si_x proportional to current to the trigger unit ETU. The switch device SS includes a switch transistor T, the switch state of which can be controlled (changed) by way of a light signal So_x of the trigger unit ETU.

Figure 4:
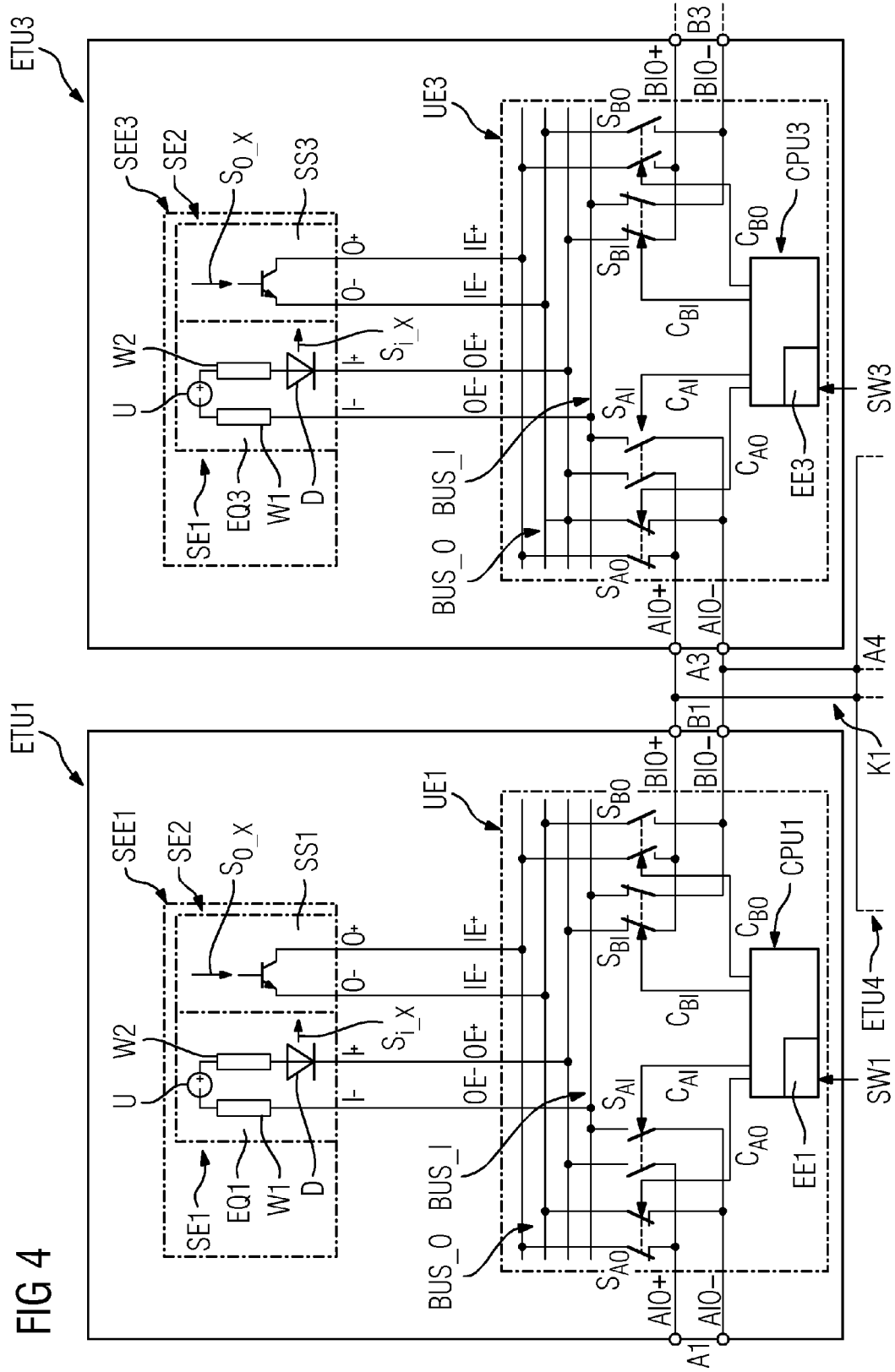
FIG. 4 shows two trigger units, connected to each other, according to FIG. 3 of the switch arrangement according to FIGS. 1 and 2.

FIG. 4 shows the two trigger units ETU1 and ETU3, connected to each other, of switches CB1 and CB3 according to the trigger situation of FIG. 1. It is merely shown that the trigger unit ETU4 is connected to the two trigger units ETU1 and ETU3 according to the connection K1.

A diode circuit, e.g. a Graetz rectifier or full-wave bridge rectifier, can be disposed directly after the connection terminals A and B for reverse polarity protection.

When the energy flow direction R is reversed, for instance, the energy flow direction R3 in FIG. 2 is compared to FIG. 1, the processor unit CPU closes the direction switches SAI and SBO and opens the direction switches SAO and SBI.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Although the invention has been illustrated and described in detail on the basis of the preferred example embodiment, the invention is not limited by the disclosed examples and other variations can be derived herefrom by the person skilled in the art, without departing from the scope of protection of the invention.

What is claimed is:

1. A method for assigning current using a switch arrangement, wherein two switches in the switch arrangement are directly connected in series according to current, and wherein each of the two switches includes a trigger unit to correspondingly check whether a current satisfied a previously given current condition, the method comprising:
    sending, when the current condition is satisfied and via the trigger unit of one of the two switches which is postpositionally placed as viewed in an energy flow direction, a signal to the trigger unit of a correspondingly prepositionally placed one of the two switches; and
    at least not immediately triggering, after receiving the signal, the prepositionally placed one of the two switches, wherein each of the trigger units is configured to send and receive the signal, measure the energy flow direction in an associated one of the two switches, and when the energy flow direction is reversed, convert from sending to receiving or from receiving to sending.

2. The method of claim 1, wherein each of the trigger units includes a first signal element and a second signal element, and when a first of the trigger units is directly connected to a second of the trigger units, and the first signal element of the first trigger unit is connected to the second signal element of the second trigger unit, and when a conversion takes place, the second signal element of the first trigger unit is connected to the first signal element of the second trigger unit.

3. The method of claim 2, wherein one of the two signal elements of each of the trigger units is formed as a switch device while another of the two signal elements is formed as an energy source, the switch device in one of the trigger units forming a circuit together with the energy source in another of the trigger units, and
    when the signal is sent, the switch device of the postpositionally placed switch correspondingly closes, wherein at least one of a voltage change and a current change caused in the circuit by a switch operating forms the signal, and the signal is measured by the prepositionally placed switch.

4. A switch arrangement for assigning current, comprising:
    two switches connected directly in series according to current, wherein each of the two switches includes a trigger unit which correspondingly checks whether a current satisfied a previously given current condition,
    the trigger unit of one of the two switches, postpositionally placed as viewed in an energy flow direction when the current condition is satisfied, being configured to send a signal, to at least prevent an immediate triggering of a correspondingly prepositionally placed one of the two switches, after the signal is received by the trigger unit of the prepositionally placed one of the two switches,
    each of the trigger units being formed so as to send and receive the signal, and each of the trigger units including
        a measurement unit configured to measure an energy flow direction in an associated switch and
        a conversion unit configured to convert from sending to receiving or conversely from receiving to sending when the energy flow direction is reversed.

5. The switch arrangement of claim 4, wherein each of the trigger units includes two different signal elements, wherein one of the signal elements of one of the trigger units is correspondingly connected to another of the signal elements of another of the trigger units, and when a conversion takes place, a connection is only correspondingly made between remaining other two signal elements of the respective two trigger units.

6. The switch arrangement of claim 5, wherein
    one of the two signal elements of each of the trigger units forms a switch device and the other of the two signal elements forms an energy source, the switch device in one of the trigger units being configured to form a circuit together with the energy source in another of the trigger units, and
    the switch device of the postpositionally placed one of the switches is correspondingly connected to the energy source of the prepositionally placed one of the switches and is configured to form a circuit together with the same, wherein the switch arrangement is configured to cause at least one of a voltage change and a current change in the circuit, the change forming the signal.

7. The method of claim 1, wherein the switch arrangement includes more than two switches.

8. The switch arrangement of claim 4, wherein the switch arrangement includes more than two switches.

* * * * *